June 30, 1970  J. A. KROSBY  3,517,734
HEAT EXCHANGERS
Filed Feb. 23, 1968
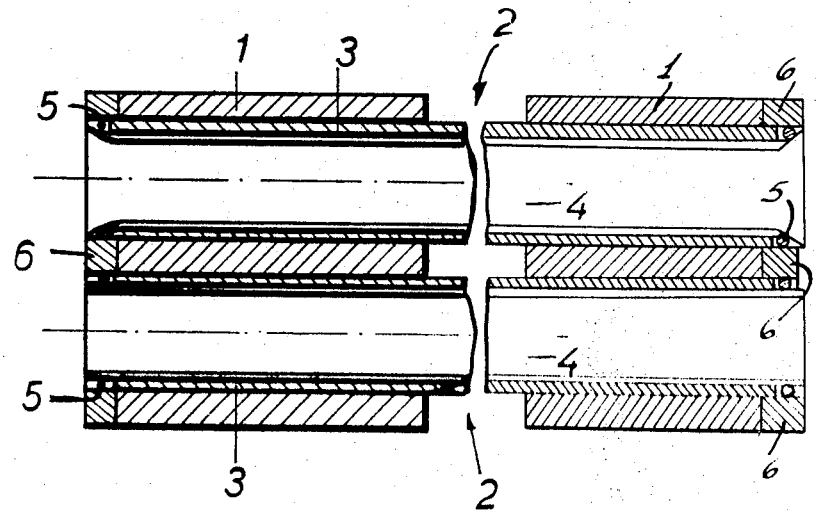

3,517,734
HEAT EXCHANGERS
Johannes Anders Krosby, Hauketo, Norway, assignor to Kvarner Brugs Kjoleavdeling A/S, Sandvika, Norway
Filed Feb. 23, 1968, Ser. No. 707,519
Claims priority, application Norway, Mar. 16, 1967, 167,315
Int. Cl. F28f 21/00
U.S. Cl. 165—178                      3 Claims

ABSTRACT OF THE DISCLOSURE

An improvement in the attachment of heat exchange tubes to tube plates, wherein one heat exchange medium passes through the tubes, while the other medium contacts the tubes externally. In order to withstand different chemical attacks from the different media each tube consists of two concentric tubes of different metals resistant to a respective one of said chemical attacks. To prevent the outer medium from contacting the inner tube at the ends, the outer tube is made shorter than the inner tube while the inner tube is expanded in the tube plate, the end of the outer tube forming a seating for a packing ring which is compressed due to said expansion.

---

This invention relates to an improvement in heat exchangers of the type in which a large number of tubes extend between two tube plates which form end walls in a chamber in which lie the outsides of the tubes, while the insides of the tubes collectively form the inner surface. The exchange of heat takes place due to difference in temperature between the media in said chamber and in the tubes respectively. These media may be of various types and are often corrosive, for example in refrigeration plants on board ships, one medium is seawater and the medium on the other side of the heat-exchanging surfaces is ammonia.

Under such conditions it is difficult to find materials which are equally resistant to attacks by the two different media. One solution is so-called compound tubes comprising two tubular sections which lie concentrically to one another in circumferential contact throughout the entire length, the outer tube being of a material which is resistant to the chemical attack to which it is subjected on the outside, whereas the inner tube is resistant to the other chemical attack to which it is exposed on the inside.

From the point of view of corrosion, this is an expedient solution, but it involves mechanical problems, difficulties arising in securing tubes of two materials to the tube plates. Some materials may be brazed or welded and others not.

This invention aims primarily at overcoming this disadvantage by providing an improvement in heat exchangers, the improvement resulting in a satisfactory fixture and sealing of the tube ends in the tube plates without welding and without use of fixing devices which perhaps cannot resist the differences and changes in temperature. When welding, it is difficult to avoid contact of the material with the media with which it is not intended to resist attack and due to contact with such media, which may be corrosive liquids or gases, and to the corrosion which thus arises, the liquids or the gases may be contaminated in an undesirable manner. This problem is solved by the present invention, inasmuch as materials which are able to withstand corrosion only with regard to a definite chemical attack are not exposed to any other chemical action.

Heat stresses which arise through brazing and welding can also have other undesirable effects, but with the present invention, such treatment of the respective materials is obviated.

According to the invention, this is achieved through a combination of rolling and the use of sealing means which withstand the treatment to which they are subjected in this case. By making the outer tubular section somewhat shorter than the inner, a suitable step is produced where an O-ring of, for example, of neoprene can be inserted, and by rolling the end of the protruding part of the inner tube in such a way that this acquires a curved funnel shape, the O-ring will be compressed to form a seal against the inside wall of the hole in the tube plate in which the tube has been fitted, and the seal will prevent corrosive media from entering where they should not.

The invention thus relates to an improvement to a heat exchanger of the type which comprises two spaced tube plates with intermediate heat exchanging tubes fixed in holes in the tube plates, each of the tubes comprising two tubular shaped parts lying inside one another and respectively constituted of materials with corrosion resistance against respective chemical attack, and the outer tube part being shorter than the inner, the protruding ends of the inner tube part being expanded in known manner to an approximate funnel shape, to compress a washer interposed between the end of the outer tube part, the funnel shaped expansion of the inner tube part and the wall of the tube plate at the hole in which the tube has been fitted, the washer being constituted of a yielding material and forming a seal between the tube parts and between the plate and tube.

An example of the invention will be explained in more detail in the following with reference to the sole figure of the drawing which shows in section opposite ends of the heat exchanger.

A tube plate is generally indicated at 1, and 2 indicates, also generally, tubes which extend between two tube plates, the tubes being shown broken in length. Each tube 2 is a so-called compound tube and consists of an outer tube 3 which has corrosion resistance against, for example ammonia, and an inner tube 4 which for example, withstands attack by seawater at elevated temperatures.

In accordance with the invention, the inner tube 4 is somewhat longer at its end than the outer tube 3 in such a manner that around the inner tube there is formed a step where a washer 5 in the form of an O-ring may be fitted before the end of the tube 4 is rolled from the form shown in the lower tube to the funnel shape as shown for the upper tube. Through this expansion of the tube end, the washer 5 becomes firmly and sealingly positioned between the tubes 3 and 4 and the inside wall of the hole in the tube plate 1. The tube plate 1 can be covered by a thinner plate 6 of a material which has the same corrosion resistance as the inner tube 4, and then the washer 5 seals in such a way that even if leakage should occur between the metallic parts on each side of the washer 5, this will clearly form a sealing barrier between the two media under review, in such a way that each medium throughout the entire time, even in the event of leakage, will only be in contact with metal surfaces which are resistant to corrosion of just the said medium. It is advantageous that the outer tube 3 is long enough to extend somewhat into the thinner plate 6.

This method of joining is, as mentioned, advantageous in that it is always sealed, and mechanical deformation can also be carried out to a large degree without too large mechanical strains on the joints, and furthermore, the joints between the tube plate and the tube end are made without the addition of heat, since whatever heating which occurs by the expansion of the end part of the inner tube 4 is entirely without significance in this connection.

The example shown serves merely to illustrate the invention and forms no limitation to the protection this patent gives, inasmuch as other embodiments may well be envisaged which would fall within the scope of this invention.

Having described my invention, I claim:

1. An improvement in a heat exchanger of the type which comprises two spaced tube plates and cover plates abutting said tube plates with intermediate heat-exchanging tubes fixed in holes in said plates, each of the tubes comprising two substantially coextensive tubular components lying inside one another and constituted of different materials resistant to corrosion by respective chemical attack, the outer tube component being shorter than the inner tube component, the inner tube component having ends protruding beyond said outer tube component and said tube plates into the holes in said tube and cover plates, said protruding ends being flared in an approximate funnel shape to secure the tubes in said tube and cover plates, and a washer of yielding material interposed between the end of each outer tube component and the funnel-shaped protruding end on the associated inner tube component and the wall of the hole in the tube plate in which the tube is fitted, said washer being compressed by the flare at the end of the inner tube component to form a seal.

2. An improvement as claimed in claim 1 wherein the holes in the plates have a uniform diameter therethrough.

3. An improvement as claimed in claim 1 wherein said cover plates are secured to and abuts each tube plate to encircle the holes therein, said outer tube components extending partially into said cover plates, said cover plates being constituted of a material having the same corrosion resistance as the inner tubular component.

References Cited

UNITED STATES PATENTS

| | | | |
|---|---|---|---|
| 2,484,904 | 10/1949 | Pennella | 165—178 X |
| 2,904,315 | 9/1959 | Pennella | 165—82 |
| 3,123,133 | 3/1964 | Pels et al. | 165—78 |
| 3,279,532 | 10/1966 | Pfeil et al. | 165—81 |
| 3,305,012 | 2/1967 | Allen | 165—178 |
| 1,894,956 | 1/1933 | Kerr | 165—178 X |
| 2,195,403 | 4/1940 | Bay | 165—178 X |
| 3,091,483 | 5/1963 | Hruby | 285—95 |

FOREIGN PATENTS

| | | |
|---|---|---|
| 929,701 | 6/1963 | Great Britain. |

ROBERT A. O'LEARY, Primary Examiner

T. W. STREULE, Assistant Examiner